R. HUFF.
SAFETY STRAP AND BRACKET FOR MOTOR VEHICLES.
APPLICATION FILED AUG. 27, 1907.

913,139.

Patented Feb. 23, 1909.
2 SHEETS—SHEET 1.

Witnesses
J. G. Hinkel
J. J. McCarthy

Inventor
Russell Huff
by Foster Freeman Watson & Coit
Attorneys

R. HUFF.
SAFETY STRAP AND BRACKET FOR MOTOR VEHICLES.
APPLICATION FILED AUG. 27, 1907.
913,139.
Patented Feb. 23, 1909.
2 SHEETS—SHEET 2.
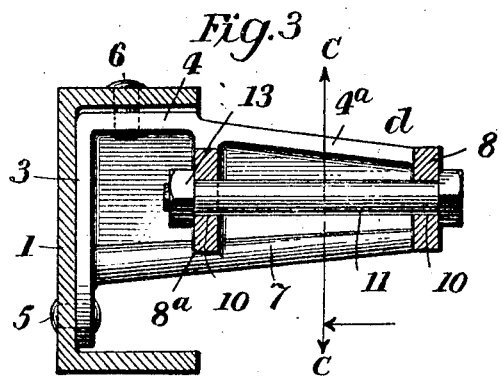
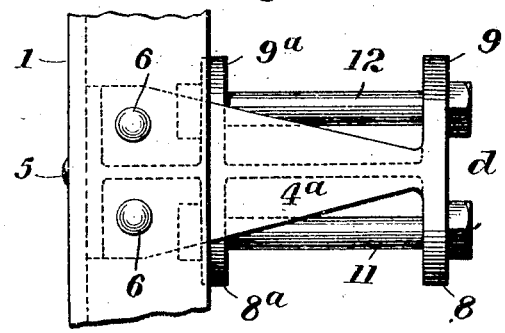
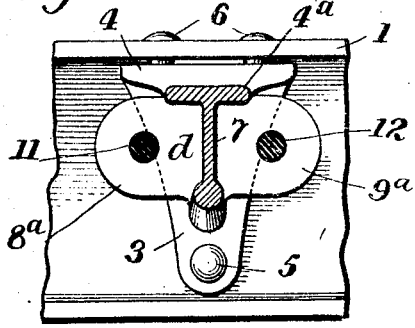
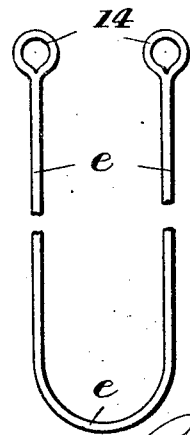
Witnesses
Inventor
Russell Huff
Attorneys

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

SAFETY-STRAP AND BRACKET FOR MOTOR-VEHICLES.

No. 913,139.  Specification of Letters Patent.  Patented Feb. 23, 1909.

Application filed August 27, 1907. Serial No. 390,351.

*To all whom it may concern:*

Be it known that I, RUSSELL HUFF, a citizen of the United States, residing at Detroit, Wayne county, Michigan, have invented certain new and useful Improvements in Safety-Straps and Brackets for Motor-Vehicles, of which the following is a specification.

In passing over rough roads, at high speeds, a relative vertical movement takes place between the axles and the frame and body of a motor vehicle, which it is necessary to limit in order to prevent disarrangement of the springs and injury to the vehicle, as well as to promote the comfort of the occupants of the vehicle. For this purpose it is customary to loop very heavy leather straps around the axles and around fixed supports on the vehicle frame, the strap ends being connected by buckles, so that each strap forms a continuous loop. Such straps which are both wide and thick are very difficult to buckle and unbuckle, owing to their lack of flexibility.

It is the purpose of my invention to overcome this difficulty. Instead of providing a buckle on the strap for connecting its ends, I provide loops at the ends of the straps and a novel form of bracket to which the ends of the strap are removably secured by bolts or bars which extend through the loops in the ends of the strap.

Figure 1:
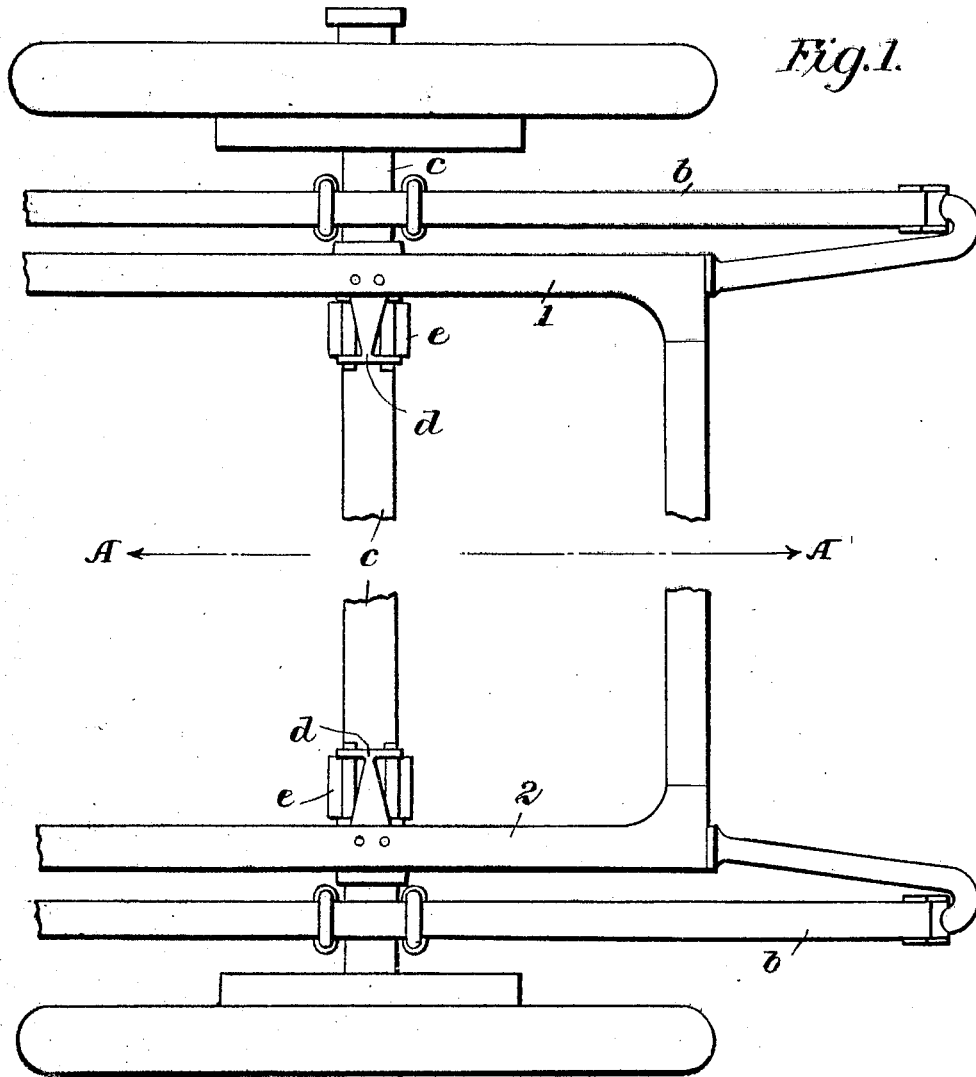
Figure 2:
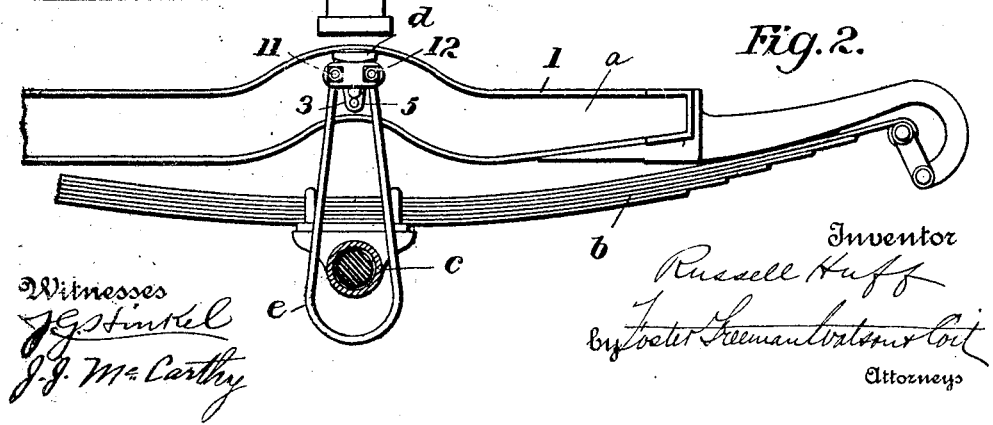

In the accompanying drawing which illustrates my invention Figure 1 is a plan view of the rear part of the frame of a motor vehicle, showing my improvements connected thereto. Fig. 2 is a section on the line A A of Fig. 1; Fig. 3 is a vertical section through one of the side bars of the vehicle frame, showing the bracket in side elevation and partly in section; Fig. 4 is a top plan view of the bracket and a portion of the frame; Fig. 5 is a section on the line C C of Fig. 3, and Fig. 6 is an edge view of the safety strap.

Referring to the drawing *a* indicates the frame of a motor vehicle, having the side bars 1 and 2, and *b*, *b* indicate the rear springs, which are supported upon the casing *c* of the rear axle, in the usual manner, and connected at their ends to the frame of the vehicle. Upon the side bars of the frame, and securely riveted thereto, immediately over the axle, are the metal brackets *d* which support the safety straps *e*. Similar brackets and straps may be arranged at the forward end of the vehicle for limiting the relative vertical movement between the forward axle and the vehicle frame and body. As the brackets and straps are all alike, a description of one bracket and strap will apply to all.

One end of each bracket *d* is suitably formed for attachment to a side bar of a vehicle frame. In the drawing, these side bars are represented as being of channel steel, and the bracket has a base or back-piece 3, of triangular form, which fits against the side or web of the bar, within the channel, and a top flange 4 which fits against the under side of the top flange of the bar. The bracket is secured in place by rivets 5 and 6 which pass through the base and top flange of the bracket, respectively. The form of the attaching portion of the bracket, will of course, depend somewhat upon the form of the part of the frame to which it is to be attached. A vertical web 7 extends outwardly, at right angles from the central part of the base 3, and flat plates or arms 8 and 9, project laterally in opposite directions from the outer end of the web 7. Similar arms $8^a$ and $9^a$ project laterally from the web 7, at a distance from the arms 8 and 9 which is somewhat greater than the width of the safety strap *e*. The arms 8 and $8^a$ have alining openings 10 adapted to receive a strap supporting bolt or bar 11, and the arms 9 and $9^a$ have similar openings adapted to receive a similar bolt or bar 12. Suitable fastening devices such as the nuts 13 are provided for securing the bolts in position.

The strap *e* has loops 14 at its ends, of sufficient size to permit the bolts to pass through. In order to secure the safety strap in position, it will be evident that it is only necessary to pass the bolts through the openings in the arms and through the loops in the strap, and to then tighten the nuts 13, and in order to remove the strap the bolts are withdrawn. The supporting arms $8^a$ and $9^a$ are arranged at such distances from the base that the strap will be held clear of the frame, and the supporting arms 8 and 9 are separated from the arms $8^a$ and $9^a$ by a distance slightly greater than the width of the strap. The top flange 4 of the bracket is preferably continued, as shown at $4^a$, to the outer end of the bracket, for the purpose of strengthening the same, and this flange preferably tapers towards its outer end. The body of the bracket, formed by the web 7 and the flange 4ᵃ, has a T-shape, in cross section, as shown in Fig. 5. The parts of the bracket, with the exception of the removable strap-supporting bolts or bars, and their securing nuts, are preferably cast or formed in one integral structure, as shown in the drawing.

What I claim is,—

1. A safety-strap bracket for motor vehicles comprising a base, a body portion projecting from the base, supports arranged at different distances from the base, and strap-supporting bars or bolts connected at their ends to said supports and arranged longitudinally of the said body portion.

2. A safety-strap bracket for motor vehicles comprising a base, a body portion projecting from the base, perforated supports arranged at different distances from the base, and strap-supporting bars or bolts adapted to fit into the perforations in said supports and arranged longitudinally of the said body portion.

3. A safety-strap bracket for motor vehicles comprising a base, a body portion projecting from the base, supporting arms projecting laterally from the body portion at different distances from the base, and a pair of strap-supporting bars or bolts connected at their ends to said arms and arranged longitudinally of the said body portion.

4. A safety-strap bracket for motor vehicles comprising a base, a body portion projecting from the base, arms projecting laterally from said body portion, and a pair of bolts or bars, supported at their ends by said arms and arranged longitudinally of the said body portion.

5. A safety-strap bracket for motor vehicles comprising a base, a body portion projecting from the base, perforated arms projecting laterally from said body portion, and a pair of bolts adapted to fit into the perforations in said arms and arranged longitudinally of the said body portion.

6. A safety-strap bracket for motor vehicles having a base or attaching portion, a web projecting outwardly from said base, a pair of perforated arms projecting laterally from said web at each side thereof, and bolts adapted to fit into the perforations in said arms.

7. A safety-strap bracket for motor vehicles having a base or attaching portion, a body portion projecting outwardly from said base, and two substantially parallel bolts or bars each supported at its ends in said bracket and arranged longitudinally of the said body portion.

8. The combination with a side bar of a vehicle frame, of a safety-strap bracket secured to said frame and projecting laterally therefrom, a pair of bolts or bars supported at their ends in said bracket, and a strap having loops at its ends, each of said bars extending through one of said loops.

9. In a motor vehicle, the combination with a safety strap looped around the axle, and with the frame, of a bracket having a base connected with the frame, a body portion extending laterally from the frame, arms at the outer end of said body portion, and a pair of rods or bolts for sustaining the ends of the strap.

10. In a motor vehicle, the combination with the frame and the axle below the frame, of inwardly extending brackets each having a base connected with the inner side of the frame and each supporting a pair of bolts or rods, and safety straps having their ends connected to said bolts or rods, said straps being looped about the axle, for the purpose set forth.

In testimony whereof I affix my signature in presence of two witnesses.

RUSSELL HUFF.

Witnesses:
MILTON TIBBETTS,
CLARA I. DALE.